United States Patent [19]

Szuhay

[11] Patent Number: 5,000,387
[45] Date of Patent: Mar. 19, 1991

[54] SHAKER

[76] Inventor: David Szuhay, 1967 Crafton Blvd., Pittsburgh, Pa. 15205

[21] Appl. No.: 362,580

[22] Filed: Jun. 7, 1989

[51] Int. Cl.$^5$ .............................................. A01G 25/14
[52] U.S. Cl. ................................. 239/374; 222/465.1; 222/553; 222/565
[58] Field of Search ................ 239/374; 222/565, 548, 222/553, 465.1

[56] References Cited

U.S. PATENT DOCUMENTS

| | | | |
|---|---|---|---|
| 40,605 | 11/1863 | Cadwell | 222/465.1 |
| 102,428 | 4/1870 | Pepper | 239/374 |
| 107,975 | 10/1870 | Stedman | 222/465.1 |
| 768,056 | 8/1904 | Livengood | 239/374 |
| 978,727 | 12/1910 | Free | 239/374 |
| 1,038,025 | 9/1912 | Tesch | 239/374 |
| 1,087,727 | 2/1914 | Case | 222/565 |
| 1,632,540 | 6/1927 | Clarke | 222/465.1 |
| 1,714,368 | 5/1929 | Hobson | 222/565 |
| 4,120,432 | 10/1978 | Fuchs | 222/565 |
| 4,596,363 | 6/1986 | Wellard | 239/374 |
| 4,752,031 | 6/1988 | Merrick | 239/542 |

Primary Examiner—Andres Kashnikow
Assistant Examiner—Christopher G. Trainor
Attorney, Agent, or Firm—William J. Ruano

[57] ABSTRACT

A scoop or pail shaped container having a plurality of openings surrounding its bottom outer portion and having a bottom cover pivotally secured to the bottom of the container. The cover has a plurality of openings about its circumference and is vertically ribbed on the outer surface to make it easy to grasp and turn in either direction. A pair of spaced semi-circular integral projections are upstanding from the cover and project through a central hole in the bottom portion to form a detachable pivot for the bottom cover. The cover has a vertically upwardly extending pin which engages an arcuate depression underneath the bottom portion, concentric with the arcuate depression to limit rotation of the cover in either direction. By adjustably varying the extent of overlap of the openings of the container and cover, variable amounts of particles in the container are dispersed uniformly.

3 Claims, 2 Drawing Sheets

SHAKER

This invention relates to a shaker having adjustable openings and constructed so as to uniformly dispense particles therefrom.

BACKGROUND OF THE INVENTION

Shakers as used in the past have many shortcommings in construction that have been eliminated by the present invention, such as the capability of quick adjustability, uniform distribution of particles, and ease of varying the area of the outlet openings embodied in the present invention.

SUMMARY OF THE INVENTION

The present invention comprises a combined scoop and shaker having a rotatable perforated bottom cover portion registering with a perforated bottom portion of the shaker for providing adjustable outlet openings, and which bottom cover portion is exteriorly corrugated to facilitate grasping and rotating the bottom cover in either direction for varying the rate of dispersion of particles contained in the shaker.

Figure 1:
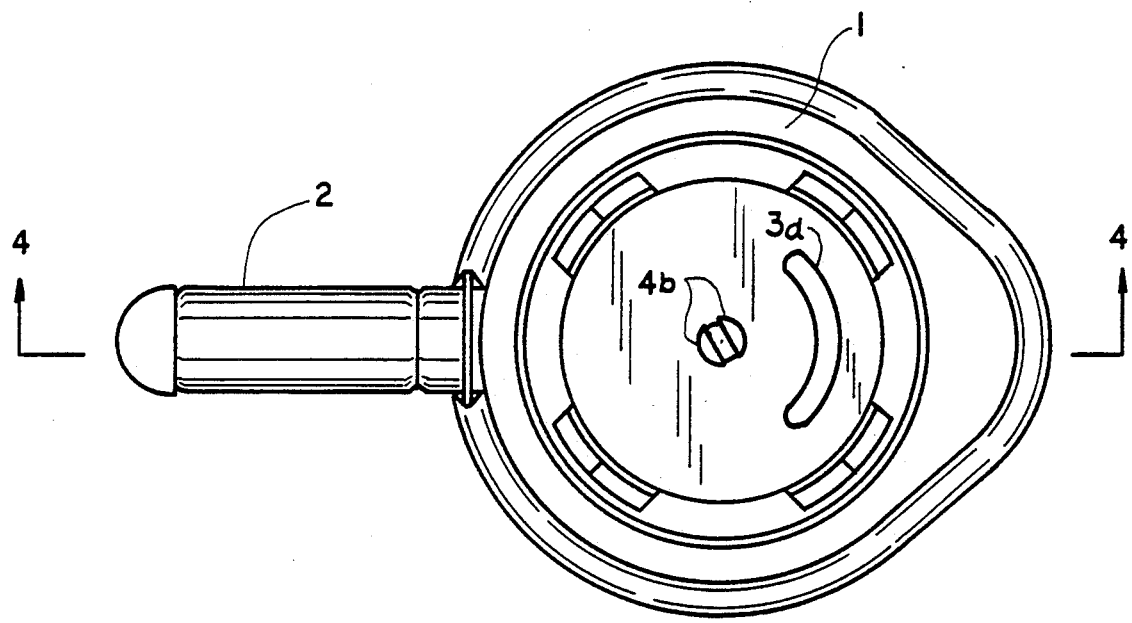
FIG. 1 is a top view.
Figure 2:
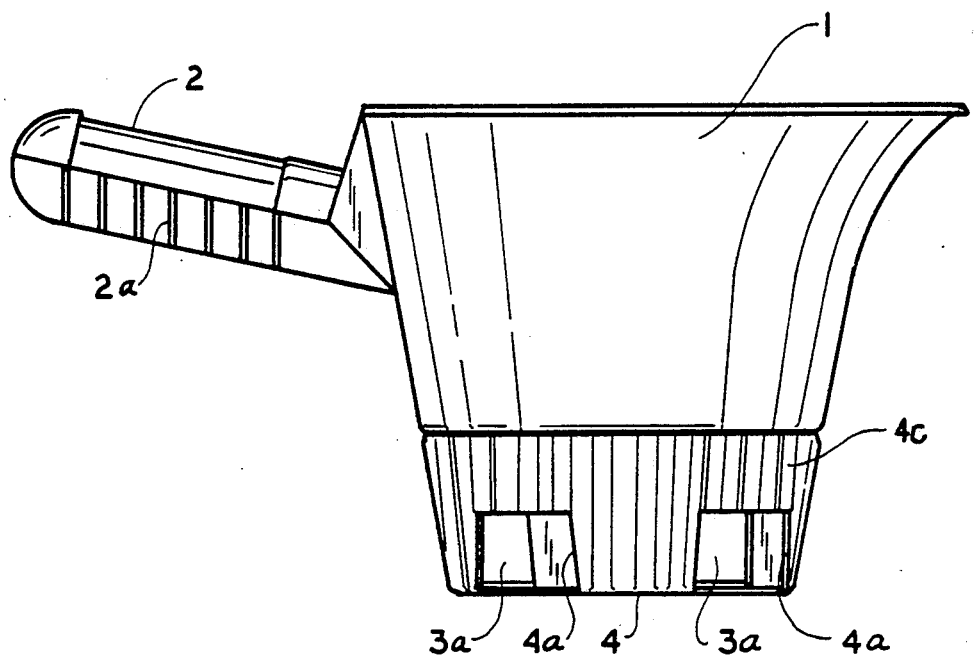
FIG. 2 is a side view of the shaker embodying the present invention.
Figure 3:
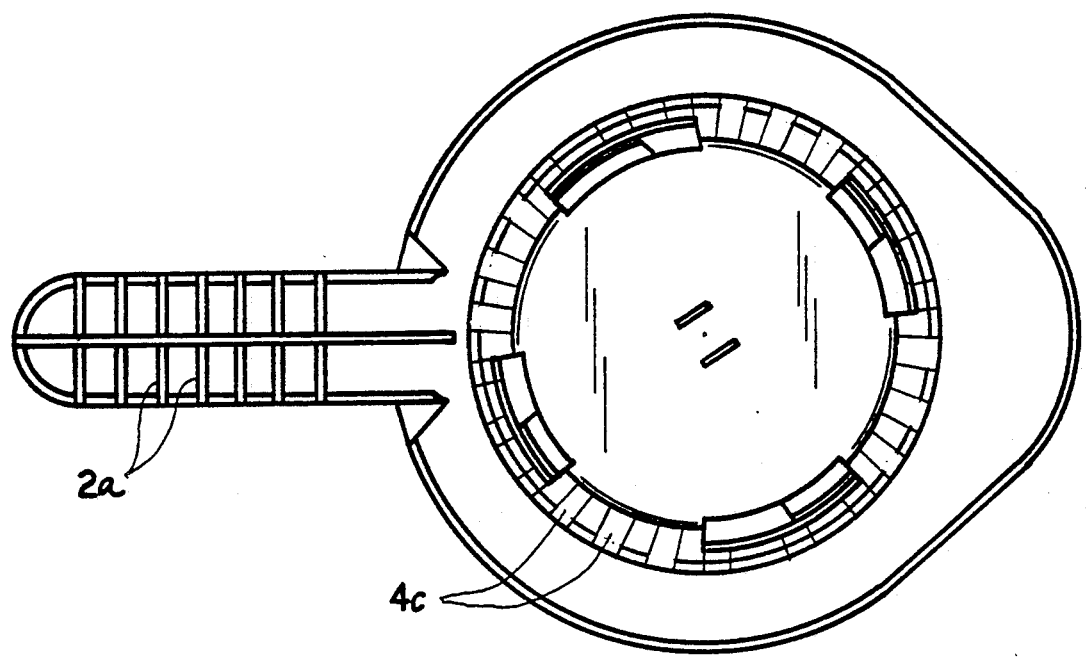
FIG. 3 is a bottom view thereof.

Referring more particularly to FIGS. 1, 2 and 3 of the drawings, numeral 1 denotes a pail or scoop shaped container having an integral handle 2 which is ribbed to form a grid at 2a, as shown in FIGS. 2 and 3, and which has a bottom portion 3 having a plurality of openings 3a, four of which are shown (FIG. 3). Portion 3 has a central opening of circular outline 3c through which extends two spaced, semi-circular springy portions 4b which are integral with the center of an outer, rotatable cover 4 of cup shape which can be easily grasped and rotated in either direction by virtue of the ribs 4c extending along the entire periphery of cover 4 as shown in FIG. 3 to prevent slipping while turning the cover portion 4. The inner surface of scoop 1 may have measurement markings.

Figure 4:
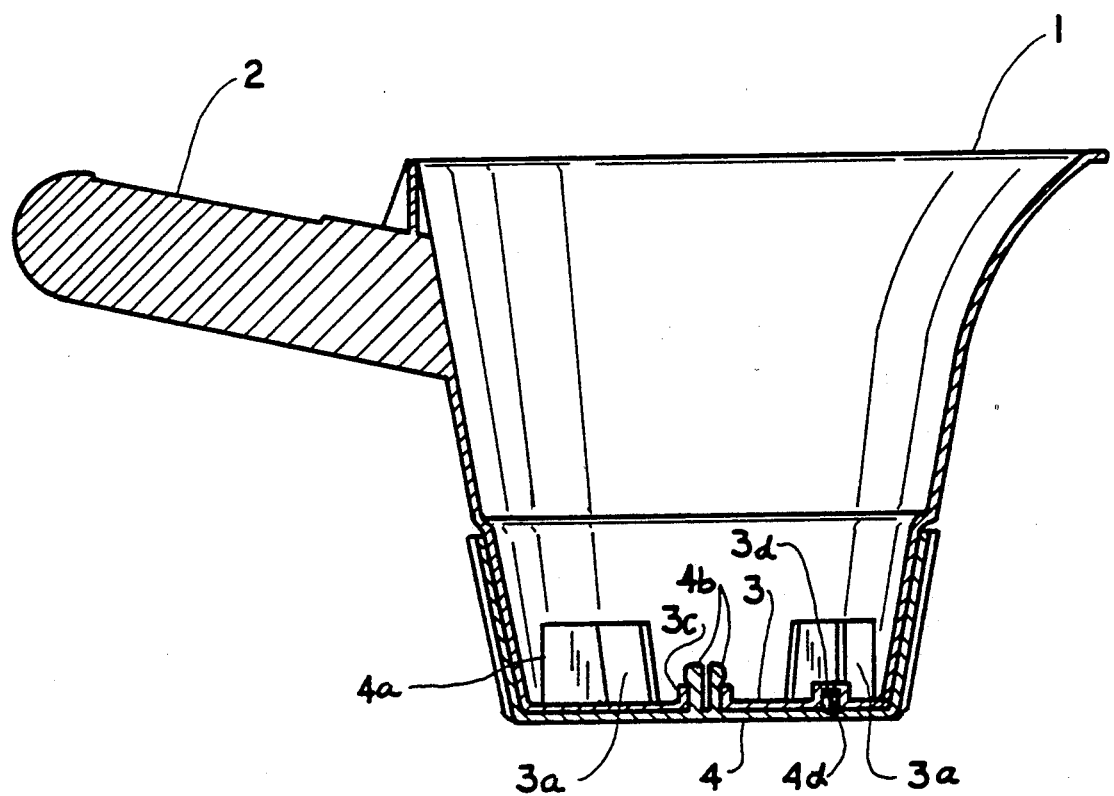
FIG. 4 is a vertical, cross-sectional view taken along line 4—4 of FIG. 1.

The extent of turning in either direction of cover 4 is limited by the width of the openings 3a and 4a and by virtue of the limit stop provided at the ends of arcuate groove 3d concentric with the cover 4 as shown in FIG. 1 into which projects an upstanding pin or projection 4d (FIG. 4) integral with the cover 4.

In operation, after the cover 4 is pushed against bottom portion 3, as the springy portions 4b extend through opening 3c and spring outwardly, they will lock the cover 4 in rotatable relationship with bottom portion 3 for the purpose of adjustably varying the size of the openings provided by overlapping of openings 3a and 4a.

Thus, maximum dispersion of the contents occurs when openings 3a of bottom portion 3 are in registry with openings 4a of cover 4.

Thus, the shaker is easy to take apart by pulling cover 4 downwardly to clean as well as to quickly assemble the cover 4 thereof by the springiness of the projections 4b.

The shaker may be made of any suitable material, for example a plastic material, such polyethylene of about $\frac{1}{8}$ inch thick. The shaker is suitable for uniformly and variably dispersing such material as salt, salt substitutes (CaClKCL etc.) sand, ash, grass seed, fertilizer, lime, powdered weed control, sawdust, oil absorbent pellets, powdered pool chemicals etc.

Such particles are scooped up by virtue of the pail shape of container 1 and dispersed by shaking the shaker lightly, side-by-side, so that the particles dispersed through the openings will fall uniformly about the circumference of the container 1.

While I have illustrated and described a single specific embodiment of my invention, it will be understood that this is by way of illustration only and that various changes and modifications may be contemplated in my invention within the scope of the following claims.

I claim:

1. A shaker comprising a scoop shaped plastic container having an integral spout portion an integral laterally extending handle portion and a cup shaped bottom portion having a central opening defined by an upstanding circular rib, a plastic bottom cover portion of cup shape telescopically fitted about said cup shaped bottom portion and having vertical ribs along its entire outer surface and having a central pair of spaced, semi-circular springy portions extending through and detachably connected to said circular rib, both said bottom portion and cover portion having arcuate openings only along the sidewalls thereof, adapted to come into and out of registry by turning said cover portion to vary the size of openings for dispersing particles of material introduced into said container, said cover portion having vertically extending ribs on its outer surface to facilitate turning of said cover portion, and a pin extending vertically upwardly from said cover portion into an arcuate groove in said bottom portion to limit turning.

2. A shaker as recited in claim 1 wherein said handle portion has ribs defining a grid underneath thereof.

3. A shaker as recited in claim 2 wherein said plastic material is polyethylene.

* * * * *